Nov. 12, 1929.   T. B. SLATE   1,735,094

METHOD AND MEANS FOR MAKING CARBON DIOXIDE SNOW

Original Filed Oct. 23, 1925

INVENTOR
Thomas B. Slate
By George C. Shoemaker
his ATTORNEY

Patented Nov. 12, 1929

1,735,094

UNITED STATES PATENT OFFICE

THOMAS B. SLATE, OF GLENDALE, CALIFORNIA

METHOD AND MEANS FOR MAKING CARBON-DIOXIDE SNOW

Application filed October 23, 1925, Serial No. 64,478. Renewed April 13, 1929.

My present invention relates more particularly to utilizing certain new principles of operation for the purpose of increasing the yield of the carbon dioxide snow which may be produced when liquid carbon dioxide is released from critical temperature and pressure of liquefaction. The invention assumes most of the well known facts, the most striking of which are that carbon dioxide cannot exist as a liquid at atmospheric pressure, and that no pressure will liquefy it unless the temperature is 88° F. or below. On the other hand, part of the liquid can be transformed to crystalline or snow form by sudden expansion, and the snow, when formed, is reasonably enduring at atmospheric temperatures and pressures, although its sublimation temperature is approximately −112° F. Upon melting, it simultaneously absorbs the latent heats both of liquefaction and boiling, thereby sublimating from solid directly to gas form, at atmospheric pressure.

In this art, my present invention, whereby the percentage of snow producible may be greatly increased, combines two cooperating features of novelty.

The first of these features has to do with the means and method for release of the liquid from critical temperature and pressure. I employ a pipe or conduit of relatively large cross-section, terminating in an outlet of relatively small cross-sectional area and under conditions affording abrupt expansion from said outlet area. In this way the available internal pressure on the liquid, which is always great, is effective for bringing the liquid right up to the relief point. This result cannot be very closely approximated if the liquid is in fact at normal, relatively high temperatures, as are customary where very high pressures are relied on to maintain the liquid condition of the carbon dioxide; so another feature of my invention involves lowering the temperature by applying the escaping, unsolidified gas countercurrent on the conduit of the incoming liquid, to increase the density and decrease the volume of the latter. This further localizes and concentrates the snow making action, already localized by the novel construction of the nozzle. In this way, the molecules will be closer together at the critical instant when they attain solidifying temperature, thus promoting a larger yield of snow.

Ordinarily, the liquid carbon dioxide in the supply nozzle will be at room temperatures say, 60° F., or even up to the maximum critical temperature, which is 88° F. The unsolidified carbon dioxide gas escaping at approximately −80° F. is applied as a refrigerating countercurrent to cool the liquid in the supply pipe near the nozzle, substantially below room temperatures. Although the gas has to be warmed many degrees in order to cool the liquid even a few degrees, and although the gas goes back to the compressor the hotter by precisely the number of calories abstracted from the liquid, I find that there is in fact advantage in such procedure.

Such application of the escaping gas to the incoming liquid is not to be confused with the idea of allowing part of the liquid to expand and using the gas countercurrent for condensing the compressed gas in the liquefier which expedient, in the case of carbon dioxide is of no advantage, since in the case of this gas, the critical liquefying temperatures range up to 88° F. and temperatures much lower than this are usually normal, or are easily attained by the simplest and cheapest types of refrigerant methods. This new idea of directly applying the cold gas countercurrent on the liquid adjacent the nozzle is entirely original with me, as also the discovery of the greater snow yield resulting therefrom.

With respect to the proportions of nozzle outlet and conduit leading thereto, I may note that satisfactory results have been obtained where the conduit and end wall thereof had a diameter of about 5/16 inch and the outlet a diameter of about 1/16 inch, making the area of the latter about 1/25th the area of the former.

The above and other features of my invention may be more fully understood from the following description in connection with the somewhat diagrammatic showing in the accompanying drawings, in which Fig. 1 is a vertical section, partly in elevations, showing the snow chamber and the added elements 28, 29 and 30 for cooling conduit 24;

Figure 3:
Fig. 3 is a detail sectional view of member 24 showing the approximate shape required for discharge passage 24.

Referring to Fig 3, which is an enlarged view of nozzle 24, I provide a reduced passage 24' approximately of the shape shown, where expansion starts and where the snow is formed.

The snow device operates by connecting pipe 4 to a suitable source of supply of liquid carbon dioxide under pressure. The valve 5' in pipe 4 is opened, allowing the liquid carbon dioxide to flow through the relatively large conduit 24 to the abrupt restriction having the relatively small area outlet 24' shown in Fig. 1, whereby the liquid carbon dioxide flows under pressure into the outwardly expanding mouth which permits sudden, free, gasifying expansion of the liquid and prevents clogging of the nozzle with frozen carbon dioxide. This sudden expansion of the liquid causes a part of it to turn to snow and the other part to gas.

Figure 1:
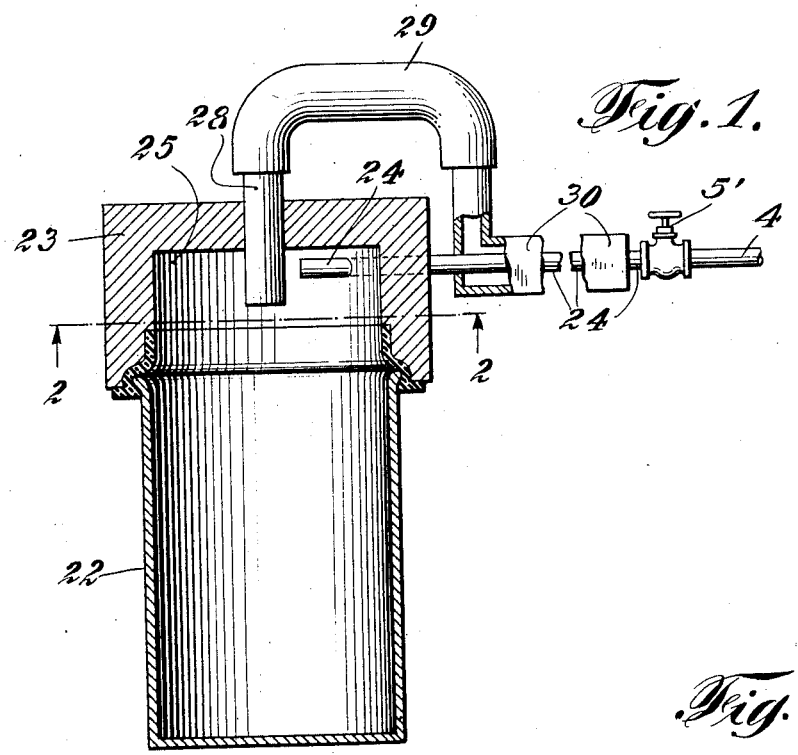
Figure 2:
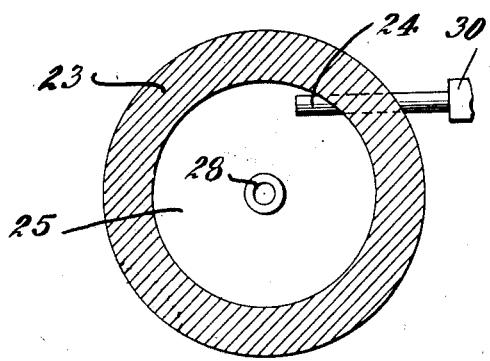
Fig. 2 is a horizontal section on line 2—2 of Fig. 1.

The above described method of making the carbon dioxide snow may be used for making snow for any purpose by applying a removable chamber to dome or converting chamber 23, as illustrated in Fig. 1, and, when filled, this removable chamber 22 may be taken off and emptied and replaced for refilling. In the present case, the escaping gas from the chamber 23 is first passed from pipe 28 to a a yoke pipe 29, and thence to a larger countercurrent cooling pipe 30, surrounding the liquid supply pipes 24 and 4, thereby to lower the temperature of the converting chamber 23, dioxide entering the converting chamber 23, and to cause a greater portion of the carbon dioxide to turn to snow; pipe 30 may then lead to the compressor not shown and be compressed back to the supply line 4, thereby saving gas escaping from the snow or converting device.

As shown herein, the nozzle discharges tangentially into the converting chamber 23 and the chamber is cylindrical, thereby causing centrifugal separation of the snow from the gas but this latter feature is set forth and claimed in my Patent No. 1,546,682, granted July 21, 1925, and my present invention is independent of what form of converting chamber may be used.

It will be noted that by making the supply conduit large right up to the outlet orifice and forming the outlet orifice in the center of the transverse wall and the small cross-section as compared with the area of said wall, there is immediately adjacent the outlet an hemispherical body of liquid that can flow to the orifice along radially converging lines. Hence, the speed of flow of the liquid can easily be maintained by the pressure to and through the orifice even though the relief at this point is very great.

While I have offered the above very good reasons which I believe account for the improved results secured by my method, it will be evident that actual observation of the gasifying point is difficult, if not impossible, and my theories as to the reasons are set forth merely as a helpful guide toward embodying my invention in apparatus that will give satisfactory results.

I claim:—

1. In the art of making carbon dioxide snow, the method which includes supplying liquid carbon dioxide under sufficient follow-up pressure and at low enough temperature to insure the liquid state and permitting sudden jet expansion of said liquid approximately to atmospheric pressure so as to yield snow and cold gas; and, as an intermediate step, cooling the liquid prior to such expansion, to lower its temperature without corresponding decrease of pressure, thereby to increase the yield of snow.

2. The method of making carbon dioxide snow, which includes maintaining a supply of the liquid under great enough pressure and low enough temperature to maintain the liquid state; utilizing the pressure and expansibility of the liquid to project a jet thereof from an orifice of relatively small area and short length; and permitting free lateral expansion of the jet liquid and resultant gas to approximately atmospheric pressure so as to convert a maximum percentage of it into carbon dioxide snow, and continuously applying said resultant gas countercurent in refrigerating heat exchange relation to the liquid supply, approaching said orifice.

3. Apparatus for expanding liquid carbon dioxide to make carbon dioxide snow, including an insulated expansion chamber permitting expansion to approximately atmospheric pressure so that a maximum percentage of the snow is formed, a nozzle projecting into the chamber, a supply conduit leading to said nozzle and means for maintaining a supply of carbon dioxide in liquid condition flowing through said supply pipe, in combination with an escape conduit from the separating chamber extending in heating exchange relation with the portion of the supply conduit that is nearest the nozzle.

4. Apparatus for expanding liquid carbon dioxide to make carbon dioxide snow, including an insulated expansion chamber permitting expansion to approximately atmospheric pressure so that a maximum percentage of the snow is formed, a nozzle projecting into the chamber, a supply conduit leading to said nozzle and means for maintaining a supply of carbon dioxide in liquid condition flowing through said supply pipe, said conduit being of relatively large cross-section and terminating in an outlet orifice of relatively small area and short length, said orifice terminating in a wide angle expander.

Signed at New York, in the county of New York and State of New York, this 21st day of October, A. D. 1925.

THOMAS B. SLATE.